Jan. 10, 1939. W. A. RAY 2,143,211
LIMIT CONTROL
Original Filed Sept. 9, 1935
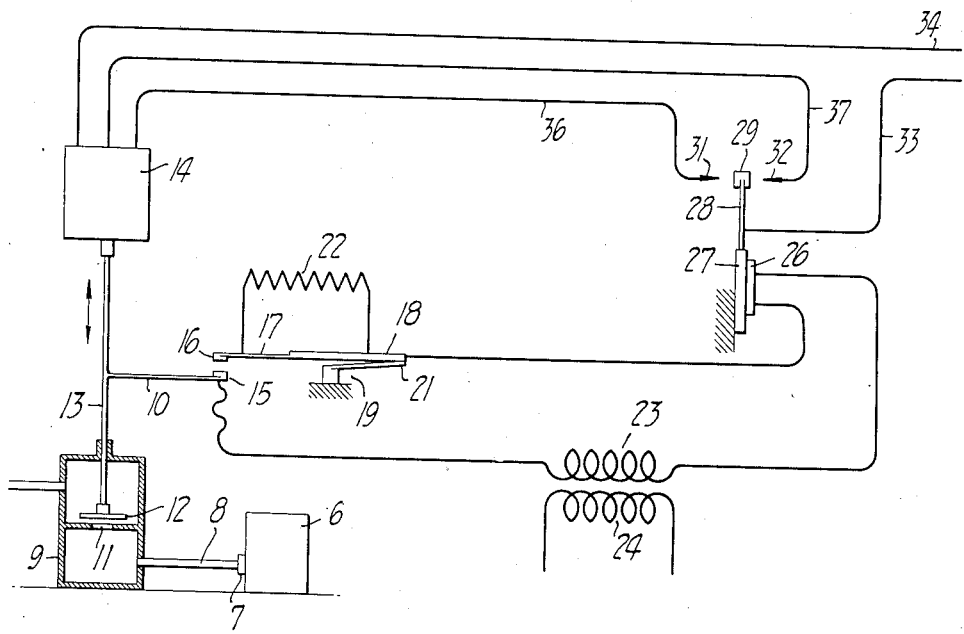
INVENTOR.
William A. Ray
BY Robert H. Eckhoff
ATTORNEY.

Patented Jan. 10, 1939

2,143,211

UNITED STATES PATENT OFFICE 2,143,211

LIMIT CONTROL

William A. Ray, San Francisco, Calif., assignor to General Controls Company, a corporation of California Original application September 9, 1935, Serial No. 39,728. Divided and this application July 21, 1937, Serial No. 154,822

2 Claims. (Cl. 236—68)

This application is a division of my prior application, Serial No. 39,728 filed September 9, 1935.

This invention relates to a limit control device, particularly one adapted to the control of a domestic heating furnace and the like.

In the operation of a domestic heating furnace, for example, it is desirable that the control device be capable of procuring a throttling action upon such means as the heat supply means. Thus, if a room thermostat calls for a temperature of 70° F. and the temperature in the room is actually 50° F. there is no objection whatsoever to the heat supply means for the furnace operating at full capacity. However, if the temperature in the room is 67° F., full capacity operation of the heat supply means will result in inefficient operation and an overrunning of the temperature of 70° F. Theoretically the most desirable operation condition would be that in which the heat supply means operated in proportion to the differential existing between the desired temperature and the actual temperature. Such operation requires a fluttering action, a throttling down of the amount of heat supply as the differential decreases so that the heat supply rate diminishes in proportion as the differential between the actual and the desired temperature. In accordance with the present invention this manner of operation is attained by creating a false thermostat temperature and by utilizing this false temperature to control operation of the heat supply means. In actual practice the invention can be considered as comprising two units, a control unit for the fuel supply and a limit control device operating upon the temperature of the room. The first unit, for example, can include a valve controlling the source of heat supply. This can be steam, or a fuel supply to a burner. The valve is adapted to be opened and closed for example by a reversible motor operating through a gear train. The rate of opening or closing movement of the valve is usually quite slow and a goodly time interval, such as ten minutes, is contemplated within which the motor will run to move the valve to either its full open or full closed position from a full closed or a full open position. Operation of the motor is under control of the room thermostat. Now if this thermostat is in a room at a temperature of say 50° F. and is set to maintain a temperature of 70° F., it will close the circuit to the motor and opening movement of the heat supply valve will start. At the same time, in accordance with this invention, the thermostat is heated by a heat supply means directly associated with the thermostat. Since this heat supply means is provided to have a certain rate of heating, and since a considerable differential exists between the actual room temperature and that which is desired, some time will elapse before the thermostat attains that temperature at which it will shut off operation of the motor opening the heat supply valve. During this time the heat supply valve will be opening. When the thermostat finally attains that temperature, due to artificial heating thereof, at which it shuts off the motor, the heat supply valve will be very close to its full open position and the heat supply will be at the maximum rate. When the thermostat does cut off opening movement of the heat supply valve, the valve remains open. However, the heating of the thermostat is under the control of another device which is associated with the opening of the heat supply valve. In one instance, to be hereinafter set forth, a strip of bimetal is likewise heated and is included in a unit controlling the heating of the thermostat. This strip of bimetal being likewise heated, results in a breaking of the circuit to the heater on the thermostat.

When the room temperature begins to rise, the thermostat of course due to its artificial temperature loading from the associated heating means reverses operation of the motor and starts a slow closing movement of the fuel supply valve. However, the aforementioned bimetal strip is effective to open the heating circuit of the thermostat and the thermostat therefore is not heated continuously with the result that it works back and forth. In actual operation, the false temperature loading decreases as the temperature of the room rises and as it approaches the value for which the thermostat is set it decreases almost entirely until the thermostat finally shuts off.

The device that has been described makes possible the use of remote control of a heat supply means, for example, to the end that a throttling action can be secured on the heat supply means. In its simplest form, the limit control device described can be made to function at a considerable distance from the heat supply means for only four wires. The advantage of such a structure is obvious and it is therefore in general the broad object of the present device to provide an improved limit control device enabling control to be maintained and an operation to be secured which is in relation to the difference existing between the set of existing conditions and the set of desired conditions. The device is of course applicable to pressure control as well as temperature control and the previous discussion of the thermostat can be substituted for by a pressure responsive development to the end that a desired pressure can be maintained.

The invention includes other objects and features of advantage, some of which, together with the foregoing will appear hereinafter wherein I have disclosed the preferred form of my invention.

In the drawing accompanying and forming a part hereof the single figure is a diagrammatic representation of apparatus and a circuit for practicing the present invention.

In accordance with this invention I provide means for controlling the operation of the device, in this instance a furnace 6 being chosen as illustrative. A burner 7 cooperates with and suplies heat to the furnace 6. Fuel is supplied to the furnace 7 through line 8 and the flow thereof is through a valve 9, the heat supply control valve. This valve includes a valve seat 11 and a cooperating valve member 12 carried upon a valve stem 13. The valve stem is raised and lowered by a suitable motor 14. This motor can be either electrically or thermally operated and is adapted to move the valve stem positively in two directions so that the valve member 12 moves toward and away from the seat 1. Suitable electrical and thermal motors of this type are well known and need not be further discussed here except to say that I have chosen for purposes of illustration an electric motor in which the motor can be rotated in either direction to raise or lower the valve stem 13 slowly through a suitable gear train. The valve stem 13 includes an arm 10 carrying a contact 15. This contact cooperates with a contact 16 carried upon an insulated extension 17 of a bimetal strip 18. Bimetal strip 18 is supported from a fixed support 19 by a like bimetal strip 21. The two bimetal strips are so placed and connected that ambient temperature is compensated and need not be considered. The heating element 22 is connected to the contact 16 and to the bimetal strip 18 with which it is in good thermal contact so that, upon current passage through the heating element, heat is generated therein and the bimetal strip is in turn heated with the result that a flexing in a clockwise direction occurs. Contacts 15 and 16 and the heating element 22 are included in a circuit with a secondary 23 of a step down transformer having a primary 24. Also included in this circuit is a heating element 26 carried upon a bimetal strip 27. An insulated strip 28 attached to the bimetal strip 27 carries a movable contact 29 which cooperates with fixed contacts 31 and 32 positioned on opposite sides of contact 29. A power source typified by lines 33 and 34 is connected respectively to the contact 29 and to the motor 14. Current passage to the motor from line 33 is through lines 36 and 37, these lines being respectively connected to different windings, for example, in the motor to secure a difference in the direction of the rotation thereof so that the valve stem 13 can be slowly raised or lowered positively. In operation, the bimetal strip 27 is subject to some temperature condition, for example that in a room. If the temperature drops too low the bimetal flexes in a clockwise direction and contacts 32. Current then passes to the motor 14 and the valve stem 13 is slowly raised bringing the contact 14 into contact with the contact 16. This results in a current flow through the heating coils 22 and 26 so that the bimetal strips 18 and 27 flex in a counterclockwise direction. This keeps contacts 15 and 16 in engagement. However, it carries contact 29 away from contact 32 breaking the circuit to the motor and leaving the valve in an open position. This does not discontinue the heating of the bimetal strip 27, however, and the bimetal strip 27 will continue to flex until it engages contact 31. This results in the motor moving valve stem 13 downwardly and, at the same opening contacts 14 and 16 and discontinuing heating of both heating coils 22 and 26. Subsequently, the bimetal strip 17 will cool and, depending upon the relation of its temperature and the position of contact 14, it may or may not again engage the contacts 14 and 16 to cause fluid flow to the burner 7.

The actual operation of the structure disclosed, in relation of the bimetal strips 18 and 28 and their associated heating coils is such that the bimetal strip 28 operates under a false temperature loading. The purpose of this loading is to enable a fluttering action of the heat supply control means typified by the valve 9. It is to be remarked that the control effected over the heat supply control means is a remote one for direct mechanical connection need not be provided between the bimetal strip, or other control means, and the valve 9. As a matter of fact, the system can be operated with as few as four wires and these can extend for any desired distance so that the heat supply control means can be remotely located with respect to the thermostat controlling its operation.

In operation, the bimetal strip 28 will secure a supply of heat at a rate in proportion to the necessity demand or, in other words, in proportion to the differential existing between a desired condition and the actual condition. For example, if a temperature of 70° F. is desired and a temperature of 50° F. exists, depending upon the setting of the particular apparatus, it is the function of the bimetal strip 28 to continue initially the full rate operation of the heat supply control means. Thus the heater 26 on the bimetal strip will have to supply a goodly quantity of heat, in view of the 20° differential existing before the bimetal strip will flex and carry contact 29 away from contact 32. During this time the motor has been slowly raising the valve stem 13 and the heat supply control is nearly wide open. When the contact 29 is separate from the contact 32 operation of the heat supply is not cut off but continues at the rate at which the valve determines. It is only upon continued heating that heater 22 carries contact 16 away from contact 14. This shuts off the heat to both heaters and bimetal strip 27 thereupon assumes its condition in relation to the temperature which exists in its locality. If this temperature is low it can contact 32 to result in a further opening of the heat supply control means.

The bimetal strip 17 is of course independent of the ambient temperature and it therefore will flutter on and off to supply heat to the heater 26 on bimetal strip 27. As the temperature differential decreases between the actual temperature and that desired, if temperature is utilized as the controlling condition, the false temperature load on the bimetal strip 27 will of course decrease as the differential decreases for engagement of contact 29 with contact 31 will result in the lowering of the valve stem 13 and a repositioning of contact 14. This requires that the bimetal strip 17 cool more each time with the result that the heatings of bimetal strip 27 become fewer and fewer so that it assumes the position more nearly identical with that of the room temperature. Since contact 15 is being lowered it will also require less heating of bimetal strip 17 to separate contacts 15 and 16 with the result that the quantity of heat supply to the bimetal strip 27 is decreased. In this way a throttling action of the heat control supply means is secured and in operation of the furnace is coordinated with the degree of demand.

The heating of a thermostatic element in accordance with valve position has been heretofore disclosed. However, in a typical instance of this, for example, the structure shown in the Kimball Patent, No. 2,059,362, of November 3, 1936, the change in valve position is indirectly imposed upon the bimetal strip by means of the heating coil associated with the thermostat. However, this is subject to the disadvantage that variation in line voltage affected seriously the operation of the structure. That is, when the line voltage varies from a normal value the rate of heating of the thermostatic element may be more or less, and as a consequence, the rate of response of the control device varies for a given valve position. The effect of this is to make the device control for other than a true valve position. In the present instance, this is obviated because if line voltage variation occurs with the structure shown herein, the variation affects the heating coil for each bimetal element to an equal extent for a given valve position. Line voltage variation is thus adequately compensated and my device operates substantially independent of variation in line voltage.

I claim:

1. In a system for the control of variations in temperature from normal, means for regulating a supply of heating medium to the space to be heated, a space thermostat for controlling said means, an electric heating element arranged to supply artificial heat to said thermostat, contact means opened and closed by movement of said regulating means including a bimetal strip for controlling current to said element, and heating means for said strip arranged to supply artificial heat to said strip during heating of said thermostat by said element.

2. In a system for the control of variations in temperature from normal, means for regulating a supply of heating medium to the space to be heated, a space thermostat for controlling said means, an electric heating element arranged to supply artificial heat to said thermostat, contact means opened and closed by movement of said regulating means for controlling current to said element, said contact means including a bimetal strip substantially independent of ambient temperature, and heating means for said strip arranged to supply artificial heat to said strip during heating of said thermostat by said element.

WILLIAM A. RAY.